Sept. 7, 1937.  A. M. DOULGHERIDIS  2,092,445

METHOD OF SEALING CONTAINERS

Filed March 6, 1935　　2 Sheets-Sheet 1

Inventor
Alcibiad Michael Doulgheridis
By B. Singer
Attorney

Sept. 7, 1937.  A. M. DOULGHERIDIS  2,092,445
METHOD OF SEALING CONTAINERS
Filed March 6, 1935  2 Sheets-Sheet 2
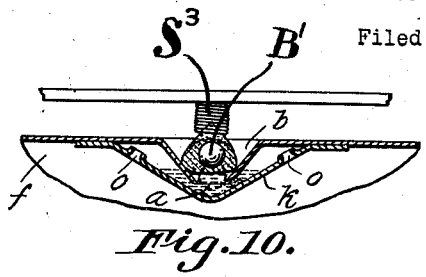
Fig. 10.
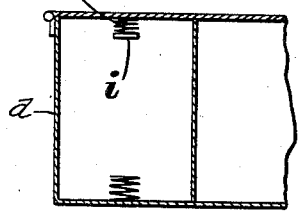
Fig. 11.
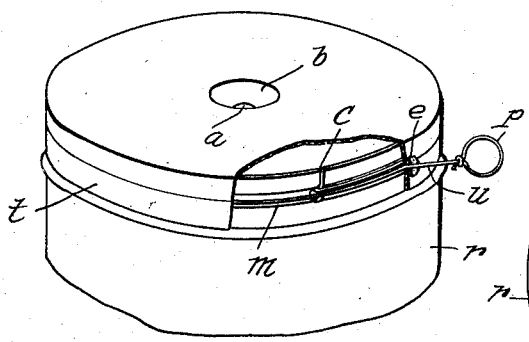
Fig. 12.
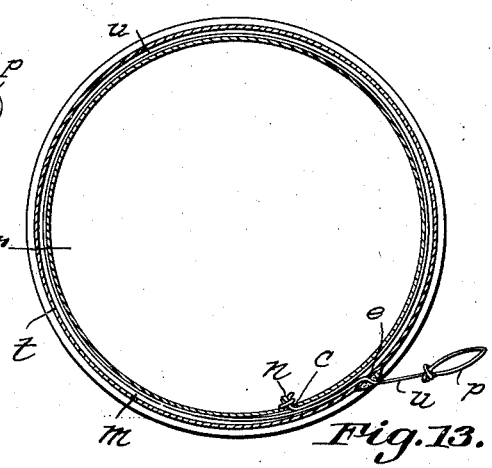
Fig. 13.
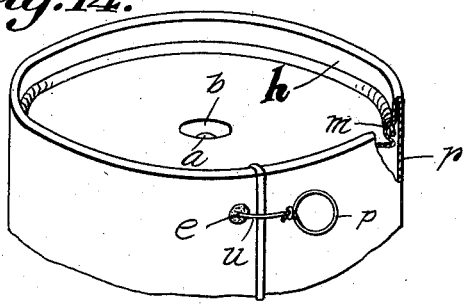
Fig. 14.
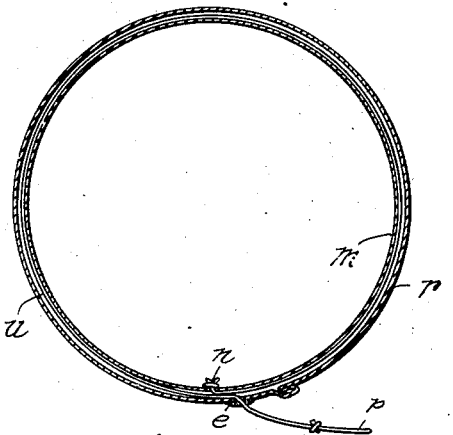
Fig. 15.
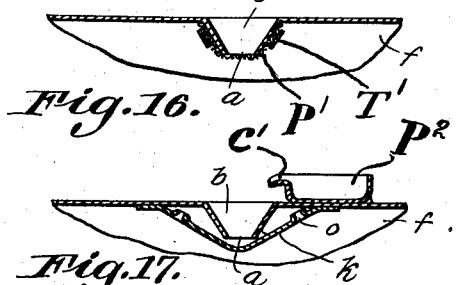
Fig. 16.
Fig. 17.
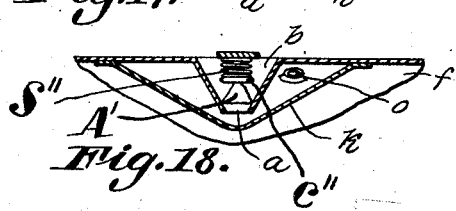
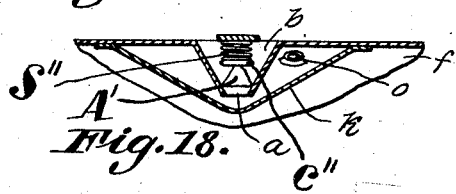
Fig. 18.
Inventor
Alcibiad Michael Doulgheridis
By B. Linger
Attorney Patented Sept. 7, 1937

2,092,445

UNITED STATES PATENT OFFICE 2,092,445

METHOD OF SEALING CONTAINERS

Alcibiad Michael Doulgheridis, Athens, Greece

Application March 6, 1935, Serial No. 9,692
In Greece March 9, 1934

9 Claims. (Cl. 113—121)

This invention relates to a method of effecting sealing of numbers of containers simultaneously, automatically and hermetically, in vacuo, with or without sterilization of the contents.

Many substances (chemical, medical and other products) which undergo changes by contact with air, have to be preserved in vacuo.

The existing systems of hermetic closure of containers, after extraction of the air and before they are placed in the autoclave, require special apparatus, and the vacuumization, as well as the actual hermetic closure, are effected separately for each container by specialized workmen. With these systems the formation of a vacuum in numerous containers simultaneously, and also sealing thereof simultaneously in numbers, are impossible. Naturally, they cannot be applied when it is necessary to sterilize the substance by the introduction of steam to the containers themselves.

The chief object of the present invention is to provide a method of sealing, in vacuo, large numbers of containers simultaneously, hermetically and automatically. A further object is to provide such a method in which the substances to be preserved in the containers are at the same time sterilized, for example, by the introduction of steam to the container.

In accordance with the present invention I provide a method of sealing numbers of containers simultaneously in vacuo, in which easily fusible material, solid at ordinary temperatures, is, in solid form, located adjacent the container-apertures to be sealed so as to allow vacuumization of the containers through the apertures, and the containers while under vacuum, are subjected to a rise in temperature sufficient to fuse said fusible material, as a result of which all said apertures are simultaneously and automatically sealed.

Preferably the top of each container has a depression at the bottom of which is located the aperture to be sealed, an upwardly facing cup or hood being located inside the container but below and around said aperture. In carrying out the sealing the fusible material, in the form of a piece of metal alloy, is dropped into said depression, the shapes of the piece of alloy and of the depression being arranged so as to allow intervening spaces which permit vacuumization of the container. Thereafter a number of such containers are simultaneously vacuumized and then heated in order to fuse the alloy which then flows into the hood or cup in each container and on re-solidifying automatically seals the aperture.

I will now describe some examples of my invention, with reference to the accompanying drawings. In the various figures the same references indicate like parts.

Referring to the drawings:—

Fig. 10 is a detail sectional view of a modification, hereinafter specifically referred to.

Fig. 11 is another detail sectional view of a portion of a receptacle for housing a number of containers hereinafter referred to.

Fig. 12 is a perspective view (parts being broken away) showing means to sever the lid from the body of the container.

Fig. 13 is a horizontal section of the structure shown in Fig. 12.

Fig. 14 is a perspective view (parts being broken away) of a modification of the receptacle.

Fig. 15 is a horizontal section of the structure shown in Fig. 14.

Figs. 16, 17 and 18 are detailed vertical sections of the modifications hereinafter specifically referred to.

Figure 1:
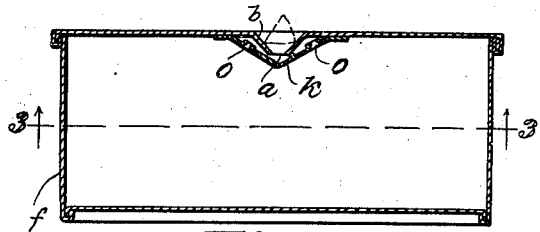
Fig. 1 is a central vertical section of a container.
Figure 2:
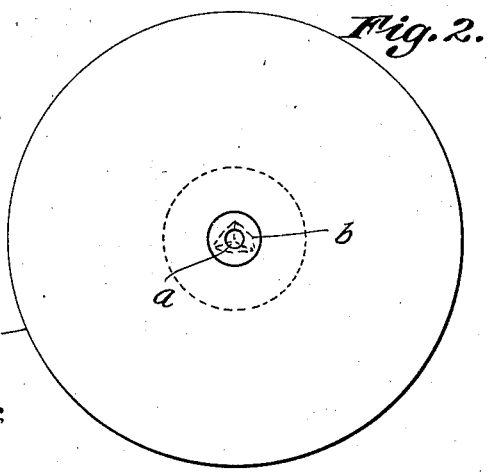
Fig. 2 is a top plan view of the same.
Figure 3:
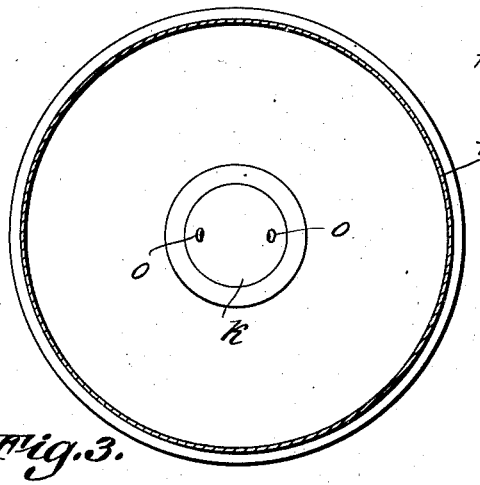
Fig. 3 is a horizontal cross section on the line 3—3 of Fig. 1.
Figure 5:
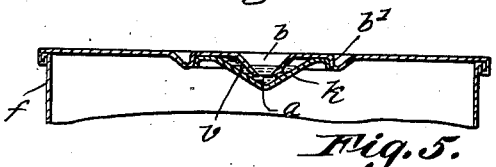
Fig. 5 is a view similar to Fig. 4, but showing a modified structure.

Consider an ordinary container or tin $f$ for preserves, Figs. 1 and 2, one of its ends has a conical depression $b$ (Figs. 1 and 2) having at the apex a hole $a$. On the interior of the container the resulting conical projection is hooded by a conical member $k$ (Figs. 1 and 3) slightly deeper than the conical projection and substantially wider, said member $k$ being attached to the container at one or two points by solder without entirely closing the hole $a$. This hood may also be retained in place by friction, namely, by a circular ridge $b_1$ which protrudes from the internal face of the container end (Fig. 5). The member $k$ has, near the rim thereof, several small holes $o$, $o$, the lips of which are bent inwards. Thus, we have a siphon arrangement by means of which the exterior of the container is in communication with the interior.

Figure 6:
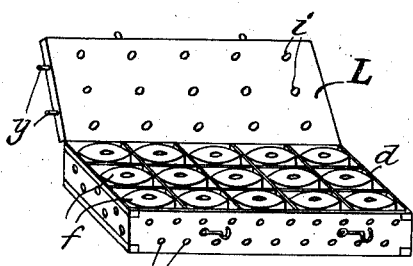
Fig. 6 is a perspective view of a receptacle for housing a number of containers.
Figure 7:
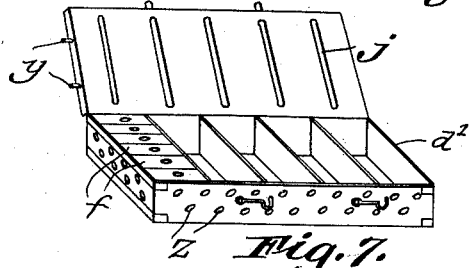
Fig. 7 is a view similar to Fig. 6, but showing a modification.
Figure 8:
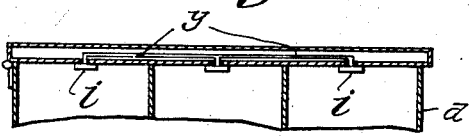
Fig. 8 is a detail cross section of a portion of the receptacle of Fig. 6 with the lid closed.
Figure 9:
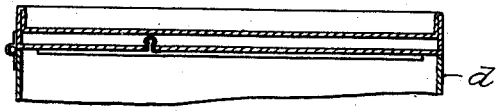
Fig. 9 is a detail cross section of a portion of the receptacle of Fig. 7 with the lid closed.

*Sealing in vacuo.*—To preserve different materials by vacuum, the containers are filled and the ends stamped on or soldered in place. In the conical depression $b$ of each container is put a small piece of an alloy fusible at low temperature, for example, of the following composition, by weight; bismuth 4: lead 2: tin 1: cadmium 1, which alloy fuses at 66° C. Any other alloy with a higher or lower fusion point may be used according to the requirements. This piece of alloy has a suitable shape, for example, a polygonal pyramid, in order not to obstruct the hole $a$ before fusing. Or, for same reason, a spherical or circular piece of alloy may be used in conjunction with a polygonal conic depression. In addition, any other suitable fusible substances may be employed, for example, paraffin, wax, or the like. The containers are then placed, preferably in large numbers at a time, with their holed ends uppermost, in a drying room, autoclave, cupboard, or like chamber, which is hermetically closed. The vacuum is created in the chamber by means of a pump. This air-tight chamber is suitably heated until the fusion point of the alloy is reached; thereupon, the alloy, on fusing, takes up the position shown at $v$ in Fig. 4, and prevents communication between the inside and the outside of each container. On cooling, soldering is effected automatically at the opening. In this way, hermetic closure of all the containers at one time is obtained by metallic soldering. If it is wished to avoid heating the contents of the containers, there is placed on each tier of containers, a plate, heated at the desired time, either by electricity or by steam, water, or other heated liquid circulating therein, or preferably the plate has, opposed to the holes $a$ in the containers, discs $i$, of aluminium for example, heated simultaneously by electrical resistances. For greater convenience, the containers can be put in a basket $d$ or $d'$ (Figs. 6 and 7), the lid $L$ of which carries the aforementioned discs (Fig. 6) or bands of aluminium $j$ (Fig. 7). When the lid is closed, the discs press on the pieces of alloy. The baskets have air apertures $z$. Several of these baskets are placed in the air-tight chamber, and the electric current passes at the desired moment through the contact points $y$, $y$, (Figs. 6 and 7) to heat the discs of all the baskets simultaneously. When desired, for more rapidly cooling the electrical resistances, the lid of the baskets may have hollow shape (see Figs. 8 and 9) and contain in it a cooling agent i. e. water.

*Sealing in vacuo, combined with sterilization, and even with cooking also in vacuum.*—By this process is obtained hermetic sealing in vacuo of containers which contain substances requiring also sterilization, such as surgical materials, foodstuffs, etc. After creating the vacuum in an autoclave, the steam is circulated and enters the containers themselves, sterilizing the contents. The fusion of the alloy is brought about automatically by the heat from the sterilizing steam itself. The baskets shown in Figs. 6 and 7 may also be employed to aid the fusion by means of electricity, after the sterilizing period, if desired. In this case the alloy melts at a temperature higher than that of sterilization. If it is wished to make the soldering effect of the pieces of alloy more certain, these latter, or the conical depressions, may first of all be cleaned, for example, by pickling. In the piece of alloy there may be incorporated, during its manufacture, a small metal ball $B'$ composed of iron, lead, tin, or the like, (see Fig. 10). A pressure is exerted on the piece of alloy by spring means $S^3$ temporarily applied. When the alloy fuses, the ball, pressed towards the bottom of the depression, closes, more or less hermetically, the opening, and, when the alloy cools, is soldered in place and ensures more certainly a perfect closure. In this case the baskets shown in Figs. 6 and 7 may also be used by placing under each disc $i$ or each container a spring $s$, to press on the balls (see Fig. 11). In this lid, the discs may, or may not, be heated by electricity, etc.

With this process, the steam enters by the small openings $a$ in the containers themselves to effect sterilization of the contents, foodstuffs (fruits, vegetables, meat, fish, etc.) may be put in the containers without adding thereto water or any other suitable liquid, and by putting the foods in the containers already prepared, cooking is combined with sterilizing, followed by automatic hermetic sealing, thus effecting great economy in time and expense, and producing superior results, the cooking being done by the steam and in vacuo.

*Opening the containers without contaminating their sterilized contents.*—When dealing with surgical material, it is absolutely necessary that the hermetically sealed container may be opened easily, without contaminating the contents during the opening operation (a thing which happens unfortunately with ordinary storage containers). To obtain this, the container is opened by pulling a metal wire $u$ (Figs. 12 and 13), placed between the rim of a lid $t$ and the side $r$ of the container. This wire is positioned before the soldering of the lid on top of the container, and lies in a groove $m$, extending round said container itself. One of the ends of the wire forms a knob or knot $n$ and is fixed by passing it into a slot $c$ in the top edge of the container, while the other end has a ring $p$ and passes through a hole $e$ made on the outer rim of the lid, said hole being closed thereafter by a drop of solder. By pulling the free end $p$ of this wire, the lid of the container is cut right round, and the container is opened without danger of contaminating the contents. After opening, the wire is taken out of the slot. This method, (which may be employed with any form of container whatsoever), allows the lid to be used to reclose the container. In order that the lid may be more easily cut by the metal wire, it may, during manufacture, be scored round the line of cutting. For the same purpose, the whole lid, or only its rim, may be made of thin sheet tin. For containers without lids and having two ends pressed on or soldered on as shown in Figs. 14 and 15, the wire may be placed between the side of the container and the perpendicular co-operating part $h$ of the end which presses against the inner surface of the side $r$. The wire $u$ lies, in this case, in the groove $m$, formed either on this perpendicular part of the end as shown, or alternatively, on the side of the container. One end of the wire passes through a small hole made in the groove itself and is soldered there, and the free end of the wire passes through a small hole $e$ on the container side placed near the usual vertical seam, and this hole is also closed by a drop of solder. In this case, also, it is advantageous, if the side $r$ is made of comparatively thin sheet tin, or scored along the line where the wire will cut it. Other arrangements for opening sheet tin containers by cutting the sheet tin with a metal wire may be also arrived at within the scope of the invention.

Modifications of the invention may be made relative to either the shape of the containers and the material from which they are manufactured, or the details and the objects of application of the process described. The following are quoted as examples of modifications:

Instead of a sheet tin container, the invention may be applied to any container whatsoever, of glass, porcelain, or other material, having a metal lid, and a suitable small opening, which latter may also be made, on occasions, of porcelain, etc. In the latter case, a convenient fusible material such as wax, paraffin, etc. is used.

The shape and the process relative to the small openings of the containers may be modified, provided only that they permit the passage of air and steam, and that they are closed by the fusing alloy or other substance without falling into the interior of the containers. In the case where there is no steam circulation, the conical member $k$ may be dispensed with by putting a piece of padding $P'$ (see Fig. 16) on the conical projection $b$ (inner side), retained there by a fillet of sheet-tin $T'$ soldered on, by a strip of gummed paper, or simply by a slight compression between the lid and the solid matter filling the container. The air passes through the padding, but the melted alloy is kept in the depression, where it solders the opening on solidifying. Where a larger depression is made with fine perforations at the bottom, these allow the air and the steam to pass through, but not the fused alloy.

It also is possible that the piece of alloy be placed, not in the conical depression $b$ (Fig. 1), but in a small pocket $P^2$ at the side of the depression (see Fig. 17), the two being connected by a shallow channel $C'$. When sterilization is completed the autoclave is suitably inclined so that the fused alloy, following the channel, is poured into the depression $b$ where it solidifies.

I may obtain, by fusing a small piece of alloy, indirect closure of the container, for example, the cover of the container has a small hole, closed by a small piece of caoutchouc $C''$, mounted on a spring $S''$ (see Fig. 18) to effect the closure. The spring is held back with the hole open, by introducing a small piece of alloy $A'$. Due to the heat, this melts, the spring returns to its position and the hole is closed.

Figure 4:
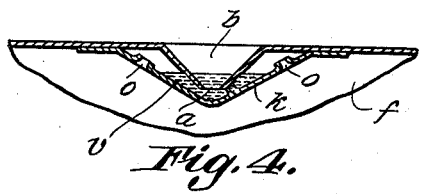
Fig. 4 is an enlarged detail vertical section of a portion of the top of the container illustrating the manner in which the fused material seals the container-aperture or vent.

The hood of Fig. 5 has vents similar to those of Fig. 4, but as the cutting plane on which Fig. 4 is taken does not go through the said vents, they do not show in said figure.

It is obvious that, the uses, sizes, details, materials and constructional dimensions, under the invention, may be modified without departing from the principle thereof.

When in the claims I refer to a "suitable treating chamber" that term is to be construed as referring to a vacuumizing and/or steaming chamber, and when I refer to "treating" the containers that term is to be construed as referring to a vacuumizing and/or steaming treatment.

I claim:

1. The method of sealing a container having a depressed portion in its top, which portion is provided with a vent and a hood below the vent; said method comprising placing a non-fusible member embedded in a fusible material in said depression without closing the vent; resiliently urging said embedded non-fusible member toward the vent so that on fusion taking place the non-fusible member positively closes the vent, vacuumizing the container and applying heat to the fusible material to release the non-fusible member for closing the vent, and then effecting cooling of the fusible material and causing it to act as a solder to hold the non-fusible member in place.

2. The method of sealing a container having a depressed portion in its top, which portion is provided with a vent and provided with means to restrain fusible material against entering the contents of the container via said vent; said method comprising placing a non-fusible member embedded in a fusible material in said depression without closing the vent; resiliently urging said embedded non-fusible member toward the vent so that on fusion taking place the non-fusible member positively closes the vent, vacuumizing the container and applying heat to the fusible material to release the non-fusible member for closing the vent, and then causing the fusible material to cool and act as a solder to hold the non-fusible member in place.

3. The method of sealing a container having a depressed portion in its top which portion is provided with a vent, the top having means to hold fusible material against entering the contents of the container; said method comprising, supporting by means of a fusible body a non-fusible member over the vent, applying heat to fuse said fusible body and simultaneously pressing said non-fusible body to the vent, and then causing the fusible body to act as a solder to hold the non-fusible member in place.

4. The method of sealing container having a depressed portion in its top, which portion is provided with a vent and means for holding fusible material from entering the contents of the container via the vent; said method comprising placing a container in a suitable basket provided with pressing and heating means, placing a non-fusible member embedded in a fusible material in said depressed portion without closing the vent, resiliently urging said embedded non-fusible members toward the vents by means of said pressing means of said basket, placing said basket with its contents in a suitable treating chamber and treating the same, applying heat by means of said heating means to fuse said fusible material and release the non-fusible members for closing the vents, and then causing the fusible material to cool and act as a solder to hold the non-fusible members in place.

5. The method of sealing container having a depressed portion in its top, which portion is provided with a vent and means for holding fusible material from entering the contents of the container via the vent; said method comrising placing a container in a suitable basket provided with pressing and heating means, placing a non-fusible member embedded in a fusible material in said depressed portion without closing the vent, resiliently urging said embedded non-fusible members toward the vents by means of said pressing means of said basket, placing said basket with its contents in a suitable treating chamber and treating the same, applying heat by means of said heating means to said chamber to fuse said fusible material and release the non-fusible members for closing the vents, and then causing the fusible material to cool and act as a solder to hold the non-fusible members in place.

6. The method of sealing container having a depressed portion in its top, which portion is provided with a vent and means for holding fusible material from entering the contents of the container via the vent; said method comprising placing a container in a suitable basket provided with pressing means, placing a non-fusible member embedded in a fusible material in said depressed portion without closing the vents, resiliently urging said embedded non-fusible members toward the vents by means of said pressing means of said basket, placing said basket with its contents in a suitable vacuumizing and/or steaming chamber and treating the same, applying heat to said fusible material to fuse said fusible material and release the non-fusible members for closing the vents, and then causing the fusible material to cool and act as a solder to hold the non-fusible members in place.

7. The method of sealing a container having a vent and means to prevent fusible material from entering the contents of the container; said method comprising supporting at a distance over the vent by means of a fusible body a non-fusible stopping member resiliently urged toward the vent, placing said container in a treating chamber and treating the container, and applying heat to fuse said fusible body and release the non-fusible stopping member to close the vent.

8. A method of sealing a container having a depression in its top, which depression is provided with a vent and means to hold fusible material against entering the contents of the container via the vent; said method comprising placing a non-fusible member embedded in a fusible material in said depression without closing said vent; placing said container in a suitable treating chamber and treating the container; resiliently urging said embedded non-fusible member toward the vent and applying heat to said chamber to fuse said fusible material and release the non-fusible member to close the vent; and then causing the fusible material to cool and act as a solder to hold the non-fusible member in place.

9. The method of sealing a container having a depression in its top, which depression is provided with a vent and means for holding fusible material from entering the contents of the container via the vent; said method comprising placing the container in a suitable basket; placing a non-fusible member embedded in a fusible material in said depression without closing the vent; placing the basket with its contents in a suitable treating chamber and treating the container; applying heat to said chamber while at the same time resiliently urging said embedded non-fusible member toward the vent to fuse said fusible material and release the non-fusible member for closing the vent; and then causing the fusible material to cool and act as a solder to hold the non-fusible member in place.

ALCIBIAD MICHAEL DOULGHERIDIS.